(12) United States Patent
Ramsauer (10) Patent No.: US 9,689,414 B2
(45) Date of Patent: Jun. 27, 2017

(54) FASTENING DEVICE FOR INSTALLING A FITTING IN A HOLED THIN WALL

(71) Applicant: Dieter Ramsauer, Schwelm (DE)

(72) Inventor: Dieter Ramsauer, Schwelm (DE)

( * ) Notice: Subject to any disclaimer, the term of this patent is extended or adjusted under 35 U.S.C. 154(b) by 0 days.

(21) Appl. No.: 14/896,129

(22) PCT Filed: May 9, 2014

(86) PCT No.: PCT/EP2014/001257
§ 371 (c)(1),
(2) Date: Dec. 4, 2015

(87) PCT Pub. No.: WO2014/194976
PCT Pub. Date: Dec. 11, 2014

(65) Prior Publication Data
US 2016/0123367 A1    May 5, 2016

(30) Foreign Application Priority Data
Jun. 7, 2013 (DE) .................. 20 2013 005 158 U (51) Int. Cl.
*F16B 19/00* (2006.01)
*F16B 21/08* (2006.01)
(Continued)

(52) U.S. Cl.
CPC ............ *F16B 21/086* (2013.01); *F16B 9/023* (2013.01); *F16B 45/00* (2013.01)

(58) Field of Classification Search
CPC ........ F16B 5/06; F16B 5/0607; F16B 5/0621; F16B 5/0642; F16B 9/023; F16B 19/00; F16B 21/086
(Continued)

(56) References Cited

U.S. PATENT DOCUMENTS 3,093,874 A * 6/1963 Rapata .................... F16B 12/30
                                                                 135/119
3,909,883 A * 10/1975 Fegen ................... F16B 21/082
                                                                 174/138 D
(Continued)

FOREIGN PATENT DOCUMENTS

DE    10 2011 10023    11/2012
EP       0 519 856     12/1992
(Continued)

OTHER PUBLICATIONS

International Search Report (PCT/EP2014/001257) dated Nov. 20, 2014.

*Primary Examiner* — Roberta Delisle
(74) *Attorney, Agent, or Firm* — Haug Partners LLP (57) ABSTRACT

A fastening device for installing a fitting or a holding clamp in a hole in a thin wall. The fastening device includes a head area with fitting parts attached thereto for clamping or enclosing a portion of the fitting or holding clamp between the head and the thin wall. The fastening device also includes a body area that proceeds from the head area and penetrates the hole in an installed condition. Proceeding from the end of the body area are two spring legs which are directed rearward toward the thin wall, and which are supported by sloping foot-like ends on two diametrically opposite, parallel edges of the hole. The fastening device forms guide strips which protrude laterally from the body area, and which are guided into suitable notches (between the opposite edges of the hole in the thin wall.

9 Claims, 7 Drawing Sheets

(51) Int. Cl.
 *F16B 9/02* (2006.01)
 *F16B 45/00* (2006.01)
(58) Field of Classification Search
 USPC .................................................. 411/508–509
 See application file for complete search history.

(56) References Cited

U.S. PATENT DOCUMENTS

| | | | | |
|---|---|---|---|---|
| 4,014,245 | A * | 3/1977 | Frye | F16B 21/02 |
| | | | | 29/525.05 |
| 4,644,614 | A | 2/1987 | Mizusawa | |
| 5,797,714 | A * | 8/1998 | Oddenino | B60R 13/0206 |
| | | | | 411/508 |
| 7,019,215 | B2 * | 3/2006 | Arai | F16B 21/086 |
| | | | | 174/135 |
| 7,306,419 | B2 * | 12/2007 | Lepper | F16B 21/086 |
| | | | | 411/453 |
| 7,481,474 | B2 * | 1/2009 | Higgins | F16B 21/086 |
| | | | | 24/292 |
| 7,878,749 | B2 * | 2/2011 | Edland | F16B 21/086 |
| | | | | 24/297 |
| 8,591,160 | B2 * | 11/2013 | Shinozaki | F16B 5/0628 |
| | | | | 24/458 |
| 2005/0220566 | A1 * | 10/2005 | Nolle | B60R 7/005 |
| | | | | 411/508 |
| 2006/0099051 | A1 * | 5/2006 | Moerke | F16B 19/008 |
| | | | | 411/508 |
| 2007/0253796 | A1 | 11/2007 | Kawai | |
| 2008/0141501 | A1 * | 6/2008 | Kuroda | F16B 21/086 |
| | | | | 24/297 |
| 2008/0298925 | A1 * | 12/2008 | Shinozaki | F16B 19/1081 |
| | | | | 411/48 |

FOREIGN PATENT DOCUMENTS

| | | |
|---|---|---|
| EP | 1 857 333 | 11/2007 |
| EP | 2 439 418 | 4/2014 |
| WO | WO 2012/129233 | 9/2012 |
| WO | WO 2012/149117 | 11/2012 |
| WO | WO 2012/175096 | 12/2012 |

* cited by examiner

FASTENING DEVICE FOR INSTALLING A FITTING IN A HOLED THIN WALL

The present application claims priority from PCT Patent Application No. PCT/EP2014/001257 filed on May 9, 2014, which claims priority from German Priority Application No. 20 2013 005 158.2 filed on Jun. 7, 2013, the disclosures of which are incorporated herein by reference in their entirety.

FIELD OF THE INVENTION

It is noted that citation or identification of any document in this application is not an admission that such document is available as prior art to the present invention.

The invention is directed to a fastening device for installing a fitting such as hook, grip, hinge, thin wall part or for installing a holding clamp in a thin wall having a hole, this fastening device comprising a head area with fitting parts attached thereto such as hook end, grip, hinge part, thin wall part with hole or with holding ears for clamping two clamp areas of the holding clamp between the holding ears and the thin wall, and comprising a body area which proceeds from the head area and which penetrates the hole in installed condition, proceeding from the end of which body area are two spring legs which are directed rearward toward the wall and which are supported by sloping ends on two diametrically opposite edges of the hole.

A fastening device for fastening a hook or other fitting in a rectangular opening or hole in a thin wall is already known from WO 2012/175096 A1. The fastening device includes a head area for carrying holding devices for holding cable arrangements, with a body area which proceeds from the head area and which penetrates the hole in installed condition. Proceeding from the end of the body area are two spring legs which face rearwards toward the wall and which are supported by sloping ends on two diametrically opposite edges of the hole.

EP 0 519 856 A1 shows a similar arrangement, but the base surfaces have a coarse knurling (see tooth strips 106). Further, reference is made to U.S. Pat. No. 4,644,614.

In the prior art, the spring legs must absorb shear forces in the bending direction thereof, which shear forces occur parallel to the surface of the thin wall. This can lead to an inhomogeneous loading of the two spring legs resulting in breakage.

SUMMARY OF THE INVENTION

It is the object of the invention to provide a fastening device which does not have these disadvantages and which particularly facilitates the installation of a holding clamp in a thin wall with a hole such that shear forces do not lead to premature breakage.

This object is met in that the fastening device forms guide strips which protrude laterally from the body area and which are guided into suitable notches in opposite edges of the hole. In this way, a centered arrangement is provided, homogeneous loading of the spring legs is ensured, and shear forces which occur do not act on the spring legs. Further, anti-rotational means are achieved which do not rely on stabile spring legs.

The fastening device can be injection molded from plastic or, alternatively, can be bent from spring steel strip.

According to a further development of the invention, it is provided in the embodiment form with the ears that the base surfaces of the spring legs are aligned with the ears in the uninstalled condition and after installation in the hole of the thin wall.

According to yet another embodiment form, it is provided that the guide strip narrows slightly at the end thereof extending to the foot. This facilitates insertion of the fastening device into the hole.

According to yet another embodiment form, it is provided that a tubular profile piece serves as an unlocking tool; when fitted on the body area, the profile of this tubular profile piece presses the spring legs together until they are freed from the edges of the hole.

BRIEF DESCRIPTION OF THE DRAWINGS

The invention will be described in more detail in the following with reference to embodiment examples which are illustrated in the drawings.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
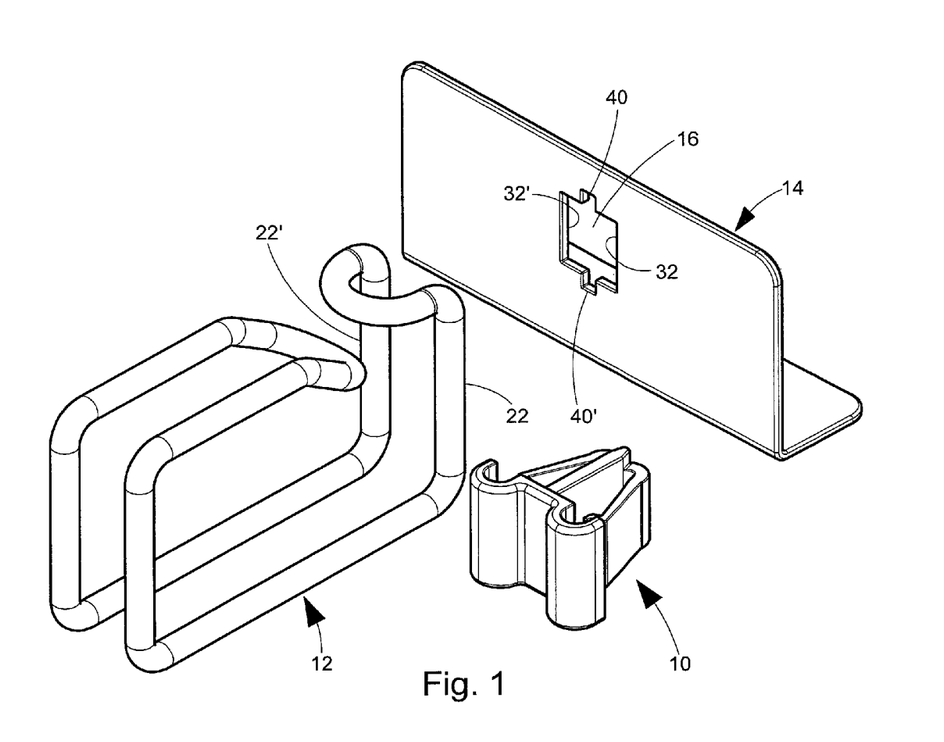
FIG. 1 shows a perspective view of the fastening device according to the invention in conjunction with a holding clamp which is held by this fastening device and a face angle with a suitable hole.
Figure 2A:
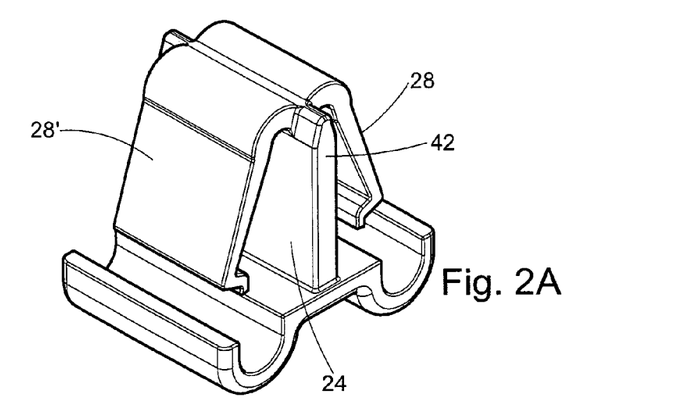
FIG. 2A shows another perspective view of the fastening device according to the invention.
Figures 2B, 2C, 2D, 2E:
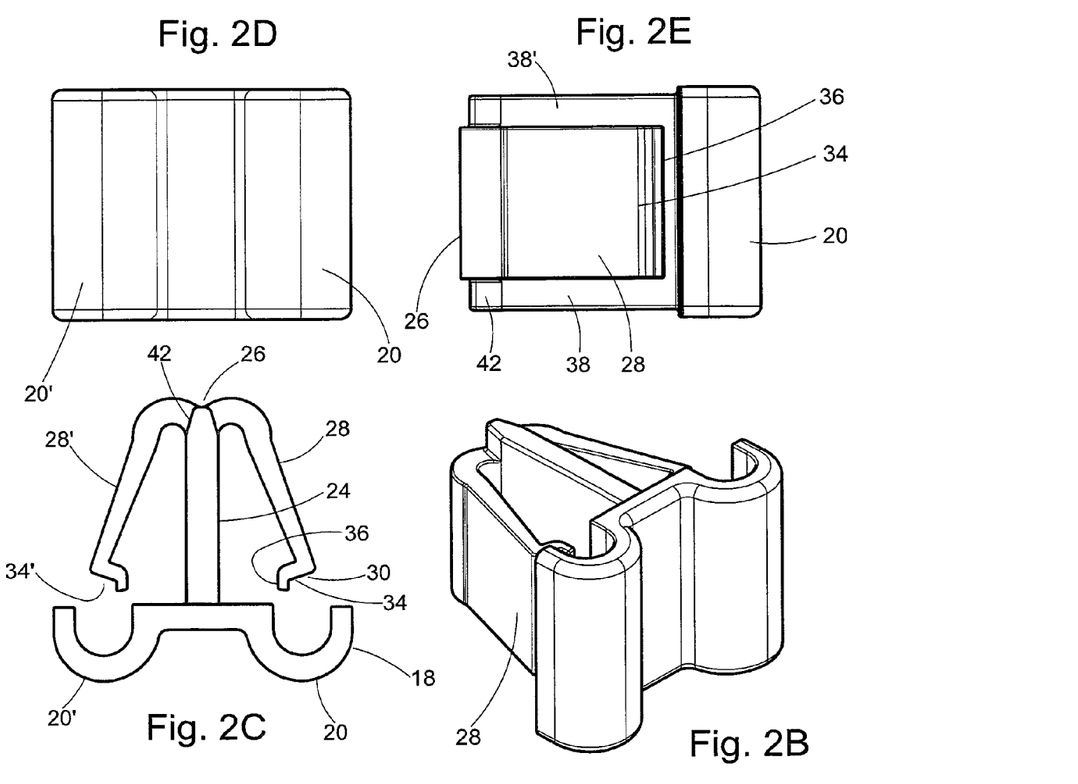
FIG. 2B shows the fastening device from yet another viewing direction.
FIG. 2C shows a side view.
FIG. 2D shows a rear view.
FIG. 2E shows a side view rotated by 90°.

FIG. 1 shows a fastening device 10 for installing a holding clamp 12 in a thin wall 14 having a hole 16.

Figure 3:
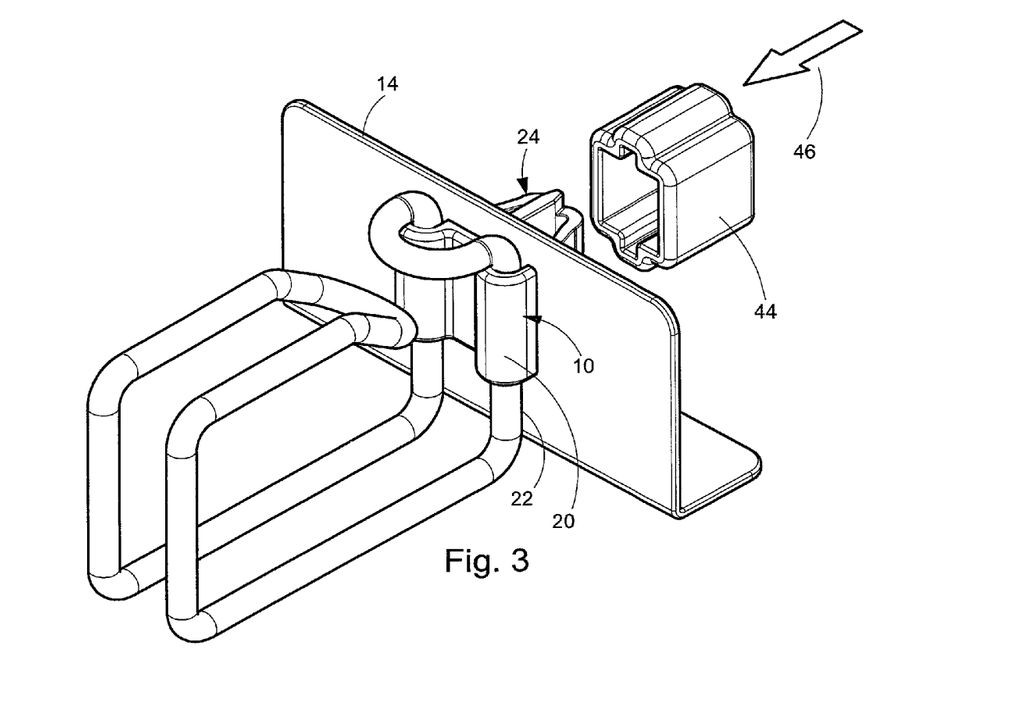
FIG. 3 shows a perspective view of the assembled fastening device.

Details of the fastening device 10 are depicted in FIGS. 2A to 2E. It includes a head area 18 with holding ears 20, 20' for clamping two clamp areas 22, 22' of the holding clamp 12 between the holding ears 20, 20' and the thin wall 14 as is shown in FIG. 3.

The fastening device further includes a body area 24 which proceeds from the head area 18 and which penetrates the hole 16 in installed condition. Proceeding from the end 26 of the body area 24 are two spring legs 28 which are directed rearward toward the wall 14 and which are supported by sloping foot-like ends on two diametrically opposite edges 32, 32' of the hole 16, this sloping surface 34 opening into a stop ledge 36. The fastening device 10 which is injection molded from plastic forms guide strips 38 which protrude laterally from the head area 24 and which are guided in suitable notches 40, 40' between the opposed edges 32, 32' of the hole 16. All shear forces are absorbed by this guide; the spring legs can also absorb other forces.

As is shown in the drawings, the sloping surfaces 34 are aligned with ears 20, 20' in the uninstalled condition as well as after installation in the hole 16 of the thin wall 14.

The guide strip 38, 38' is advisably slightly narrowed at the end thereof extending to the foot (see reference numeral 42). This facilitates insertion into the notches 40, 40'.

Figure 4A:
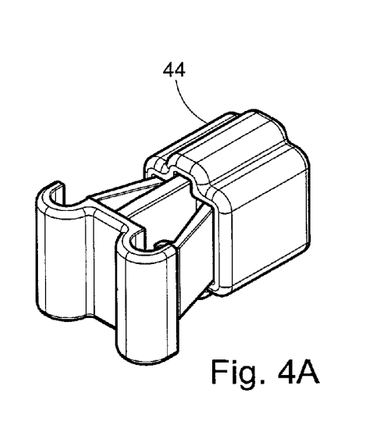
FIG. 4A shows a perspective view of the fastening device with an unlocking device.
Figure 4B:
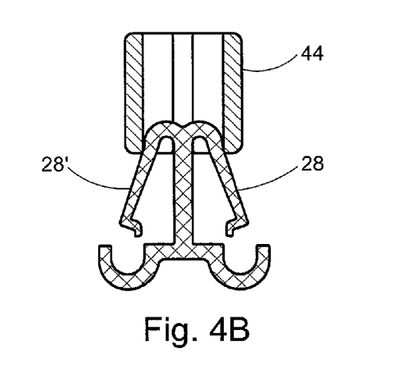
FIG. 4B shows a sectional view through the arrangement from FIG. 4A.

FIGS. 4A and 4B show that with a tubular profile piece 44 the profile of the tubular profile piece 44 is provided such that when slid onto the head area 24 of the fastening device 10 (see arrow 46 in FIG. 3), the spring legs 28 (see FIG. 4A) are pressed together until they are freed from the edges 32, 32' of the hole 16.

The further figures show other embodiment examples of the fastening device according to the invention.

Figure 5A:
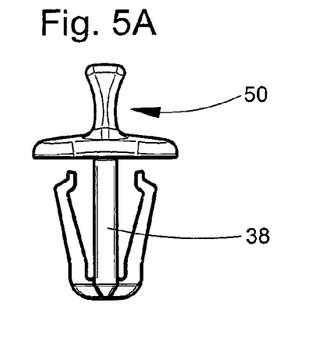
FIG. 5A shows a side view of a fastening device according to the invention for a grip.
Figure 5B:
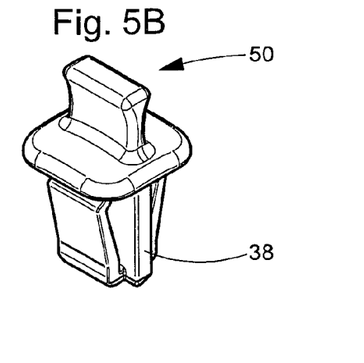
FIG. 5B shows a perspective view of a fastening device according to the invention for a grip.
Figure 6A:
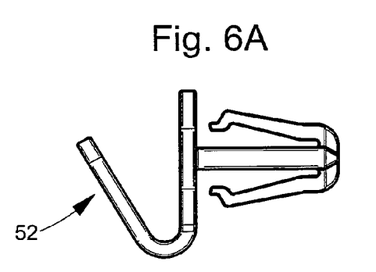
FIG. 6A shows a side view of a fastening device according to the invention for a wall hook.
Figure 6B:
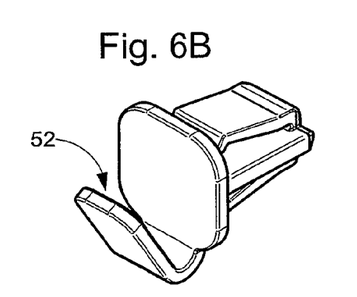
FIG. 6B shows a perspective view of a fastening device according to the invention for a wall hook.
Figure 7A:
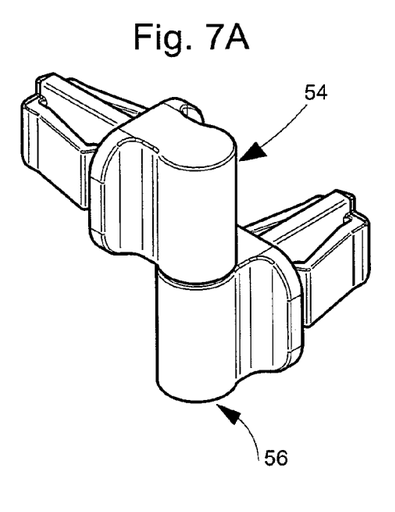
FIG. 7A shows a perspective view of two hinge parts in hinged position.
Figure 7B:
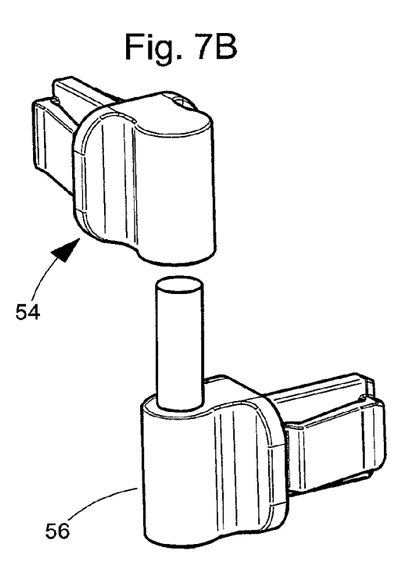
FIG. 7B shows a perspective view of the two hinge parts in unhinged position, wherein the hinge parts are provided in each instance with a fastening device according to the invention.

Accordingly, a fastening device according to the invention for a grip 50 is shown in a side view in FIG. 5A and in a perspective view in FIG. 5B. A fastening device according to the invention for a wall hook 52 is shown in a side view in FIG. 6A and in a perspective view in FIG. 6B. Two hinge parts 54 and 56 are shown in hinged position in a perspective view in FIG. 7A and two hinge parts 54, 56 in unhinged position are shown in a perspective view in FIG. 7B. The hinge parts 54, 56 are provided in each instance with a fastening device according to the invention.

Figure 8A:
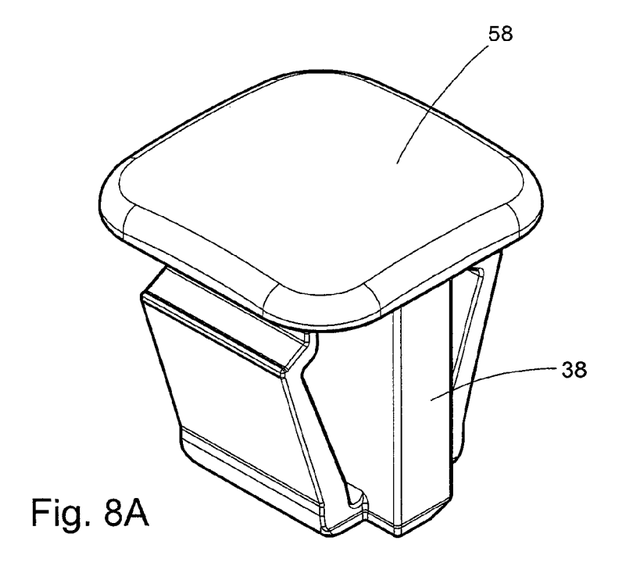
FIG. 8A shows a perspective view of a fastening device according to the invention for the connection of two thin walls provided with hole.
Figure 8B:
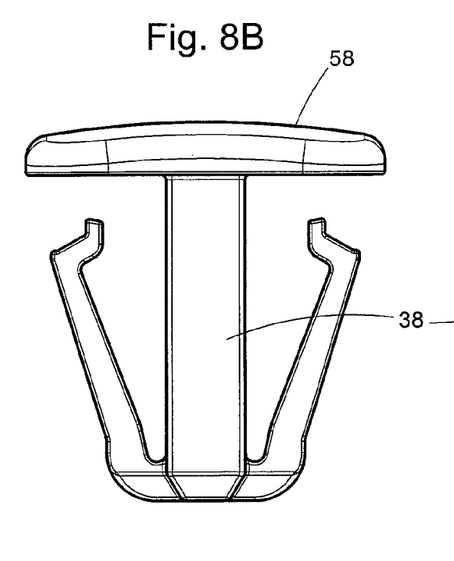
FIG. 8B shows a side view of a fastening device according to the invention for the connection of two thin walls provided with hole.
Figure 8C:
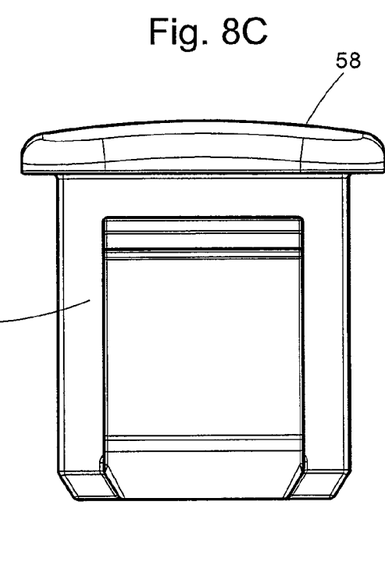
FIG. 8C shows a side view rotated by 90° of a fastening device according to the invention for the connection of two thin walls provided with hole.
Figure 8D:
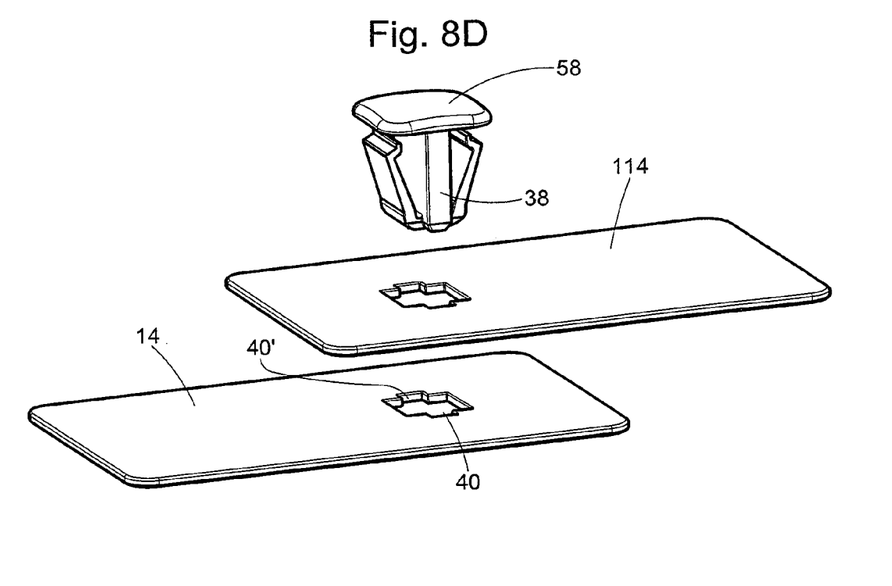
FIG. 8D shows a perspective view of the fastening device according to the invention and the two thin walls prior to installation.
Figure 8E:
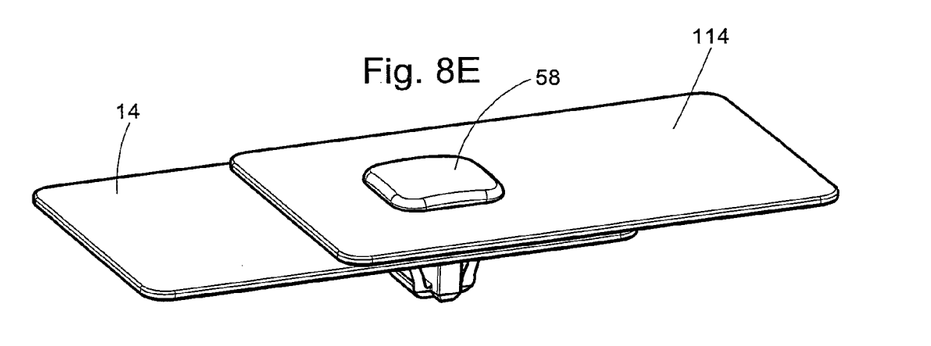
FIG. 8E shows a perspective view of the three parts after installation.
Figure 8F:
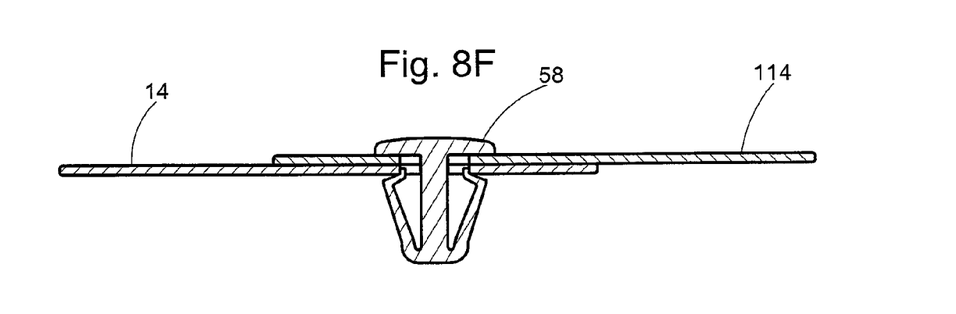
FIG. 8F shows the three parts in axial sectional view after installation.

A fastening device according to the invention with head 58 for connecting two thin walls 14, 114 provided with suitable hole is shown in a perspective view in FIG. 8A, in a side view in FIG. 8B and in a side view rotated by 90° in FIG. 8C. FIG. 8D shows a perspective view of the fastening device according to the invention and the two thin walls 14, 114 prior to installation, while FIG. 8E shows a perspective view of the three parts after installation and FIG. 8F shows the three parts in an axial sectional view, also after installation.

Figure 9A:
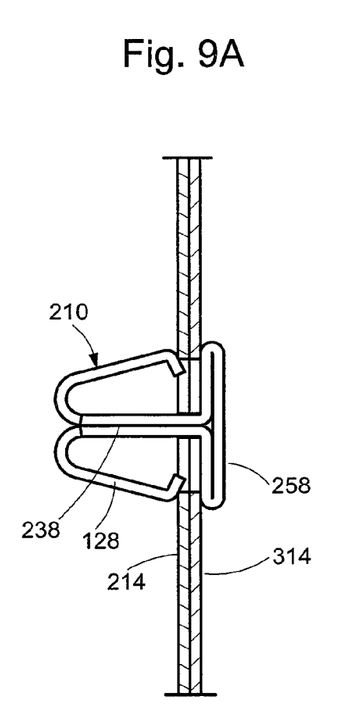
FIG. 9A shows a side view of a fastening device according to the invention which is bent from spring steel strip.
Figures 9B, 9C:
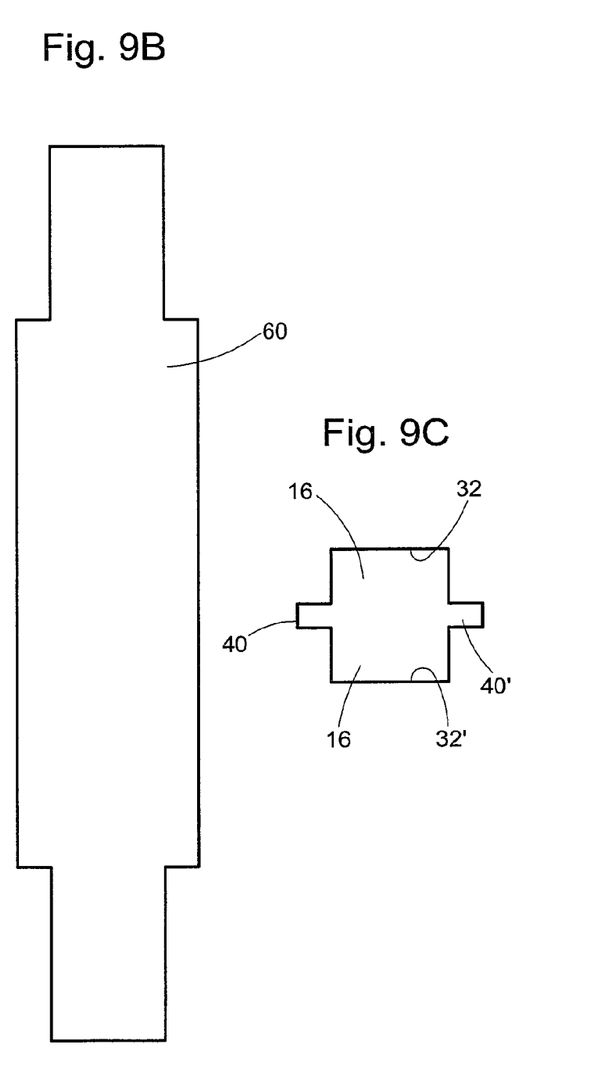
FIG. 9B shows a suitable piece of spring strip prior to bending.
FIG. 9C shows the associated installation aperture.

FIG. 9A shows a side view of a fastening device 210 according to the invention which is bent from spring steel strip, FIG. 9B shows a piece of spring strip 60 (blank) suited to this purpose prior to bending into the shape shown in FIG. 9A, and FIG. 9C shows the associated insertion aperture.

COMMERCIAL APPLICABILITY

The invention is commercially applicable in switch cabinet construction.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

LIST OF REFERENCE NUMERALS 10, 210 fastening device
12 holding clamp
14, 114, 214, 314 thin wall
16 hole, opening
18 head area
20, 20' holding ears
22, 22' clamp areas
24 body area
26 end
28, 28', 228 spring leg
30 foot-like end
32, 32' edges
34 sloping surface
36 stop ledge
38, 38', 238 guide strips
40, 40' notch
42 narrowing
44 tubular profile piece
46 arrow
50 grip
52 wall hook
54 hinge part
56 hinge part
58, 258 head (fastening device)
60 blank

The invention claimed is:

1. A fastening device for installing a fitting or a holding clamp in a hole in a thin wall, the fastening device comprising:
   a head with fitting parts attached thereto a portion of the fitting or holding clamp between the head and the thin wall;
   a body which proceeds from the head and which is configured to penetrate the hole in an installed condition, the body comprising:
     a first end; and
     two spring legs, formed at the first end, which, in the installed condition, are directed rearward toward the thin wall, and are supported by sloping ends on two diametrically opposite, parallel edges of the hole;

guide strips that protrude laterally from the body, and which, in the installed condition, are configured to be guided into suitable notches between the opposite edges of the hole in the thin wall; and a tubular-profile piece configured as an unlocking tool;

wherein, when the fastening device is in the installed condition and the tubular-profile piece is fitted on the body a profile of the tubular-profile piece presses the spring legs together until they are freed from the edges of the hole.

2. The fastening device according to claim 1;

wherein the sloping ends have a sloping surface that opens into a stop ledge.

3. The fastening device according to claim 2;

wherein the fastening device is injection molded from plastic.

4. The fastening device according to claim 2;

wherein the fastening device is bent from a spring steel strip.

5. The fastening device according to claim 1;

wherein each of the guide strips narrows at the first end and extends to one of the sloping ends.

6. The fastening device according to claim 5;

wherein the fastening device is injection molded from plastic.

7. The fastening device according to claim 5;

wherein the fastening device is bent from a spring steel strip.

8. The fastening device according to claim 1;

wherein the fastening device is injection molded from plastic.

9. The fastening device according to claim 1;

wherein the fastening device is bent from a spring steel strip.

* * * * *